April 4, 1961

W. R. WANNLUND ET AL 2,978,211

AERIAL DEVICE HAVING ROTOR FOR RETARDING DESCENT

Filed April 27, 1955

INVENTORS
WALLACE R. WANNLUND
WESLEY T. RHODES

BY S. Jay Teller
ATTORNEY

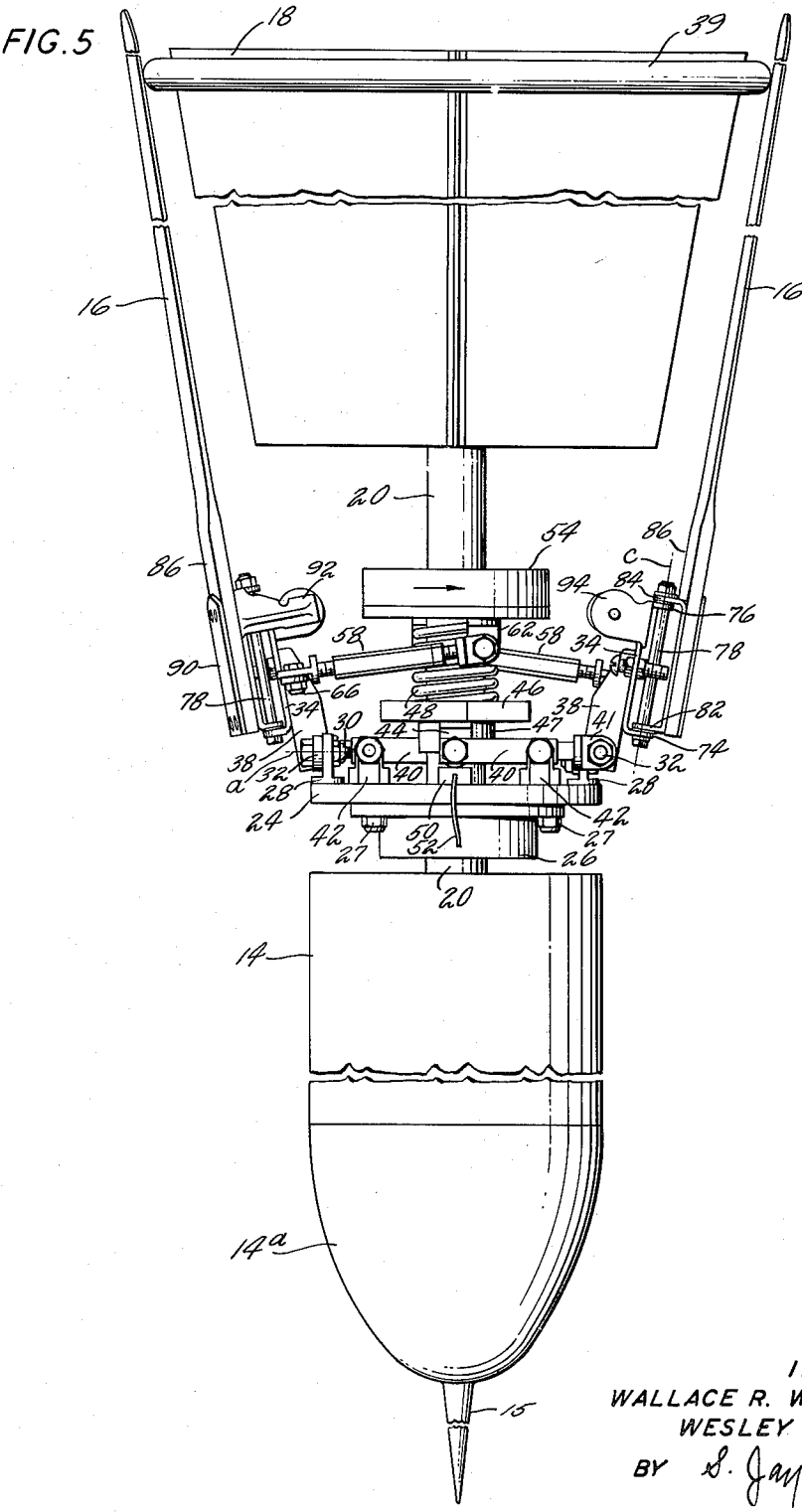

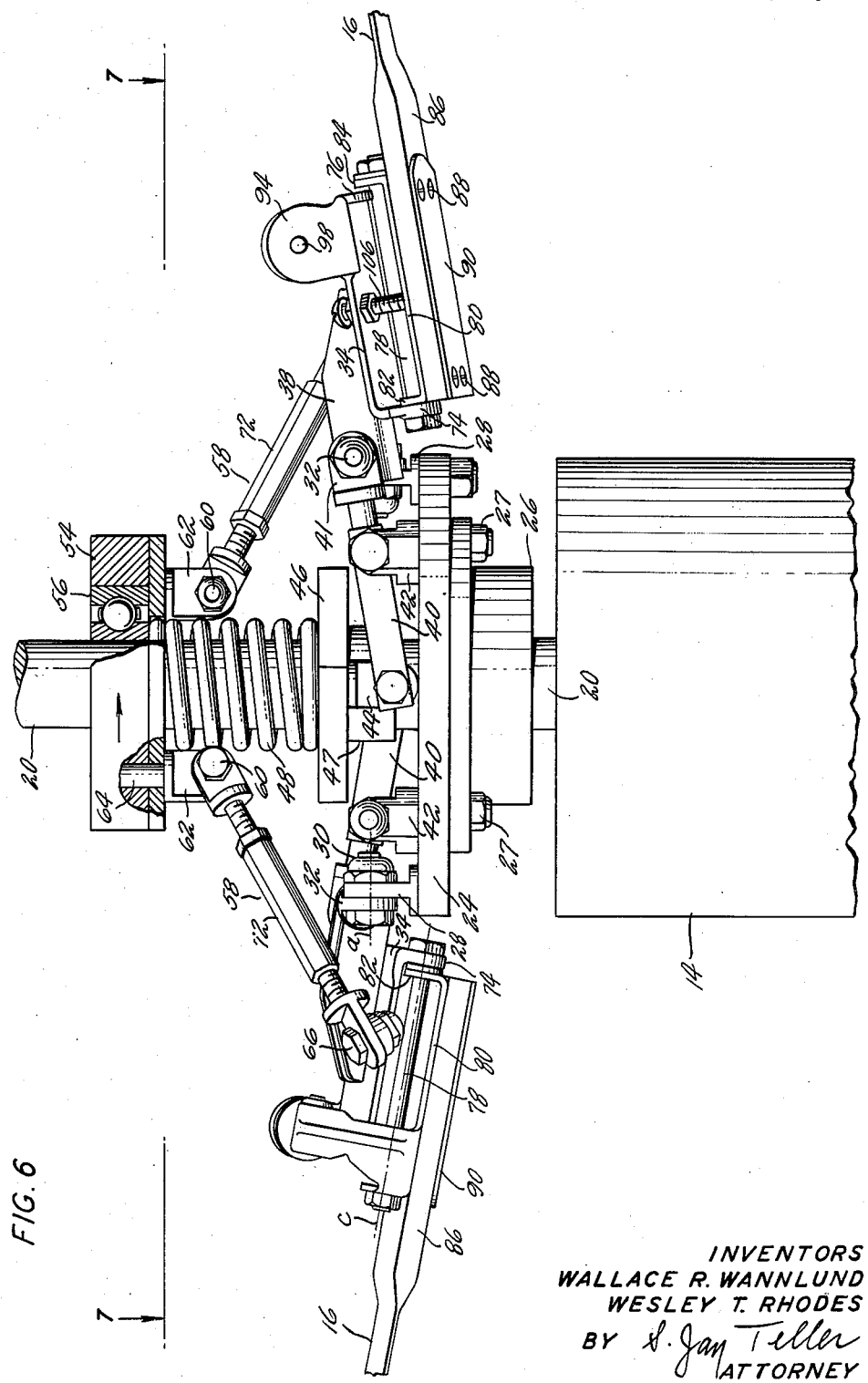

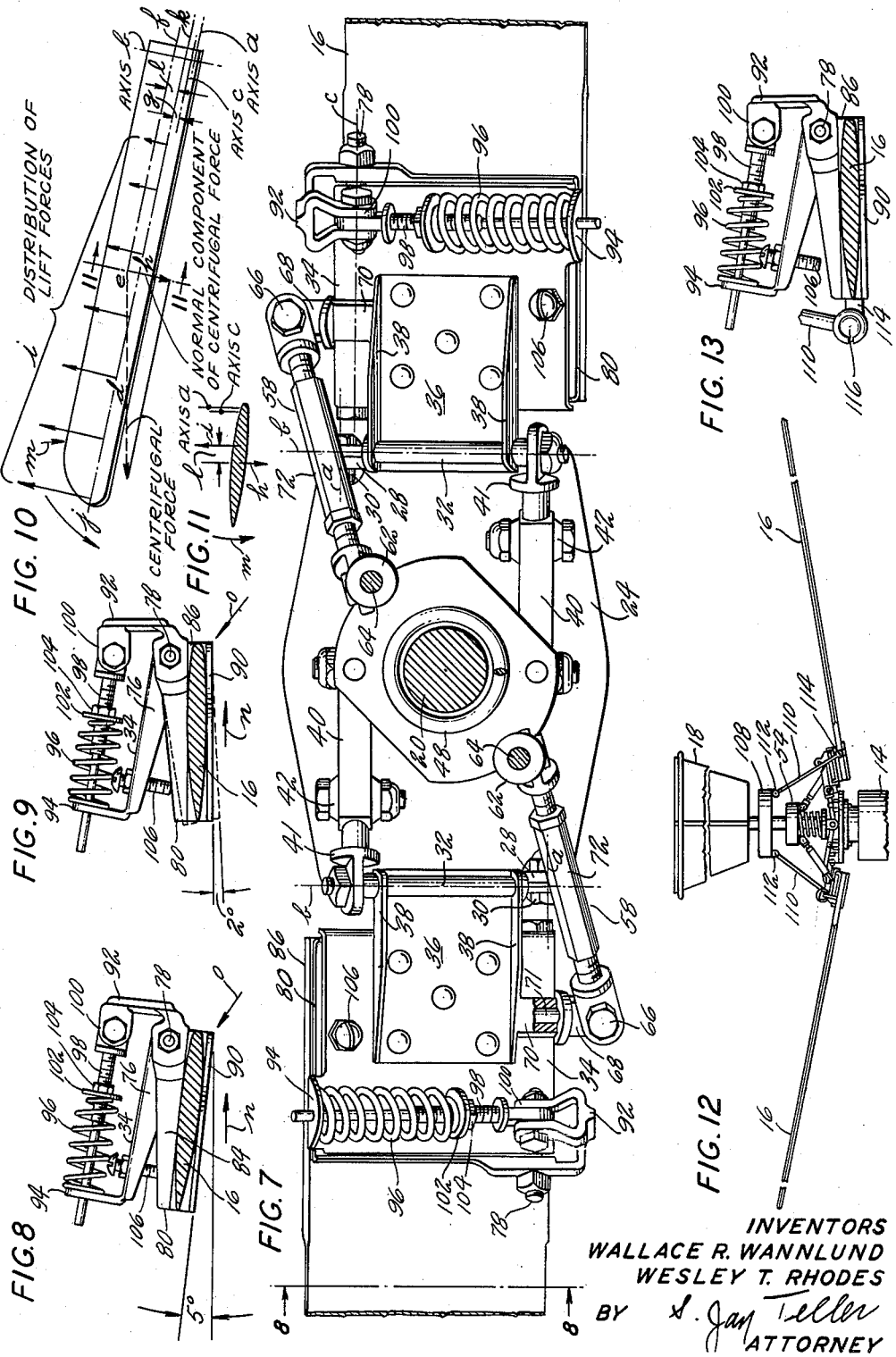

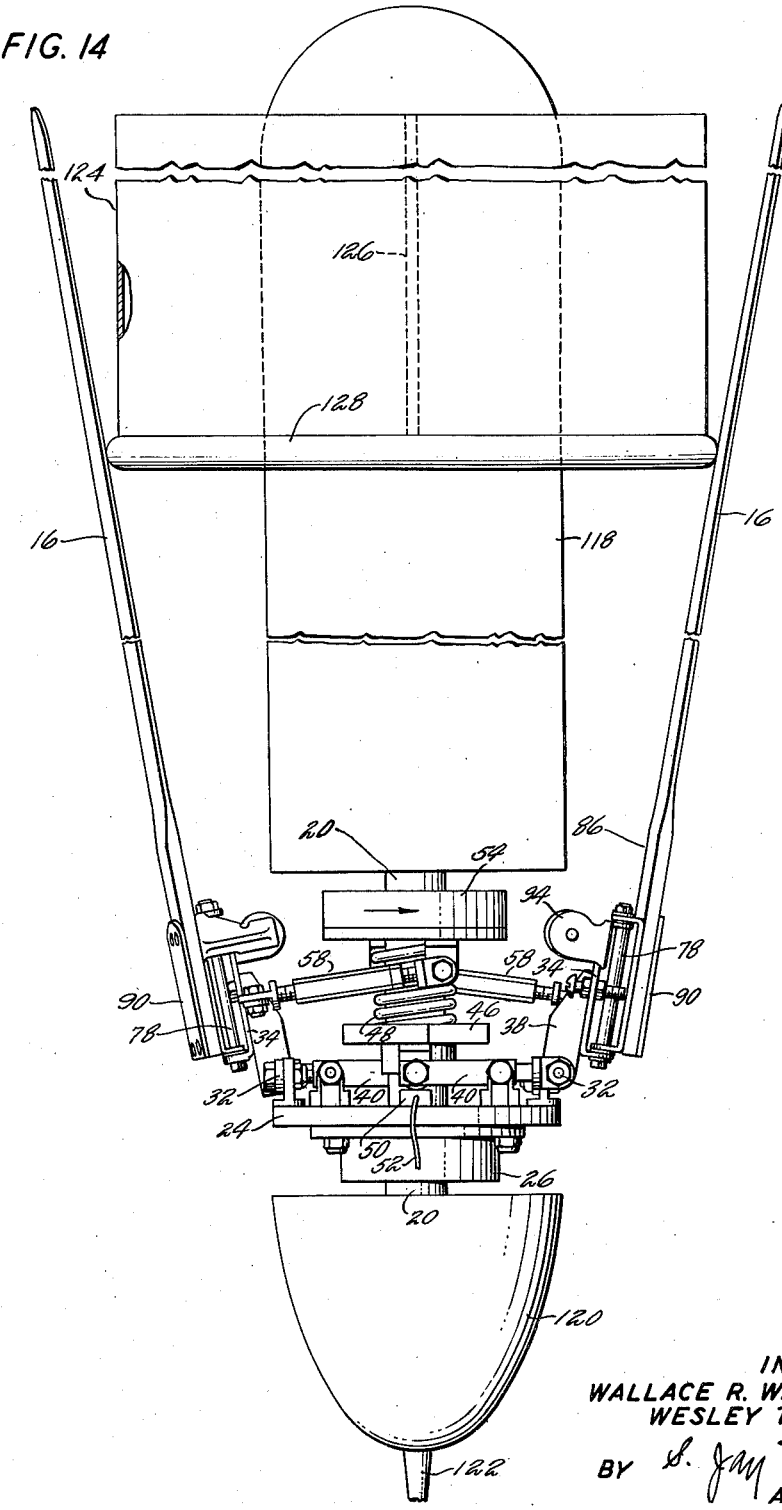

United States Patent Office 2,978,211
Patented Apr. 4, 1961

2,978,211

AERIAL DEVICE HAVING ROTOR FOR RETARDING DESCENT

Wallace R. Wannlund, Windsor, and Wesley T. Rhodes, Windsor Locks, Conn., assignors to The Kaman Aircraft Corporation, Bloomfield, Conn., a corporation of Connecticut Filed Apr. 27, 1955, Ser. No. 504,166

32 Claims. (Cl. 244—138)

The invention relates to an aerial device having a rotor for retarding descent. As an example, the invention may be embodied in a device which may be called a rotary blade parachute and which is adapted for the accurate and safe delivery of supplies or equipment from an aircraft to a station or position on the ground. The device may be carried on the aircraft as an internal store or as an external store, and it includes a container or body adapted to carry a useful load. A device embodying the invention is adapted for use at any speeds including those in the sonic range and it may be dropped for descent in a stable attitude at either a high altitude or a low altitude.

The general object of the invention is to provide a device of the type specified which is simple in construction and reliable in operation, which includes means for insuring the prompt starting of autorotation of the rotor, which includes means for preventing overspeeding of the rotor, and which has various other functional and structural advantages.

In the drawings two embodiments of the invention are shown, but it will be understood that various changes may be made from the constructions shown, and that the drawings are not to be construed as defining or limiting the scope of the invention, the claims forming a part of this specification being relied upon for that purpose.

Of the drawings:

Fig. 5 is an enlarged view of the rotary blade parachute device with its parts in the same relative positions as in Fig. 1, this view showing the device in vertical position instead of horizontal position for convenience of comparison with other views.

Fig. 6 is an enlarged side view of the device with its parts in the same relative positions as in Fig. 3.

Fig. 7 is a horizontal sectional view taken along the line 7—7 of Fig. 6.

Fig. 8 is a fragmentary sectional view taken along the line 8—8 of Fig. 7.

Fig. 9 is a view similar to Fig. 8 but showing the blade at a different pitch angle, the view in this respect being similar to Fig. 4.

Fig. 10 is a schematic perspective view of one blade with indications of the forces acting thereon.

Fig. 11 is a schematic transverse sectional view on an enlarged scale taken along the line 11—11 of Fig. 10.

Fig. 12 is a view similar to Fig. 4 but showing an alternative embodiment of the invention.

Fig. 13 is a view similar to Fig. 9 but showing in part the said alternative embodiment of the invention.

Fig. 14 is a view similar to Fig. 5 but showing another alternative embodiment of the invention.

Figure 1:
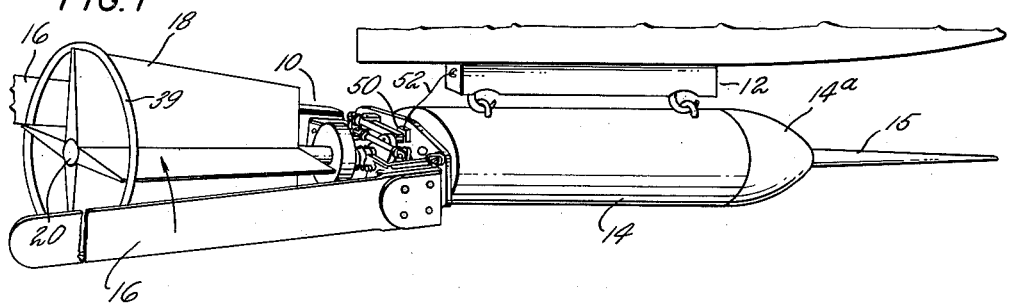
Fig. 1 is a partly schematic perspective view of a rotary blade parachute device embodying the invention, together with a fragment of the bomb rack of an aircraft for initially carrying said device.

*General description of device and manner of operation*

Referring to the drawings and more particularly to Figs. 1 to 4, a rotary blade parachute device embodying the invention is schematically shown at 10, and the bomb rack of an aircraft transporting said device is schematically shown at 12. The device 10 is releasably supported on the bomb rack 12 which constitutes a carrier for the device, said device being carried on the rack in an approximately horizontal position.

Figure 2:
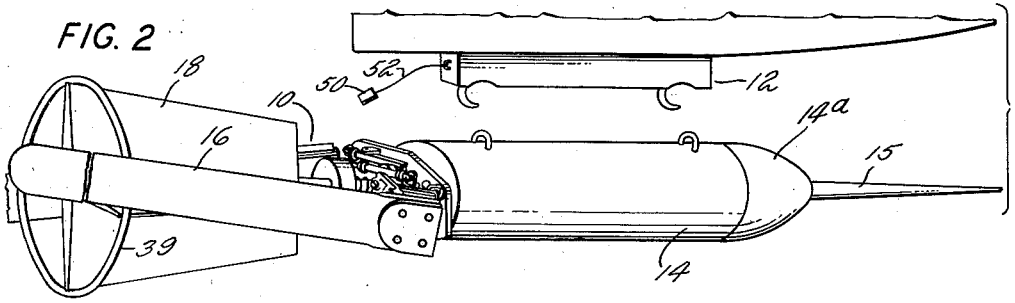
Fig. 2 is a view similar to Fig. 1 but showing the device immediately after release from the aircraft.
Figure 3:
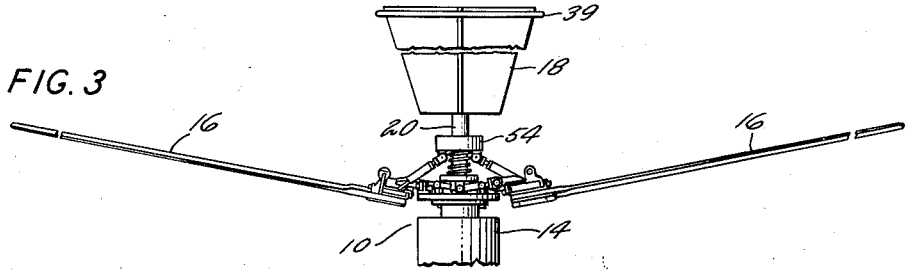
Fig. 3 is a side view of the rotary blade parachute device during descent.
Figure 4:
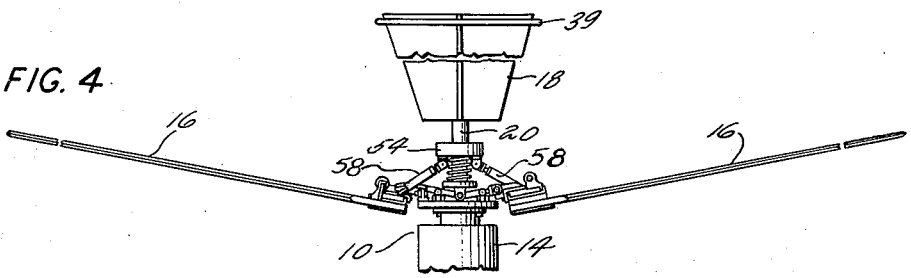
Fig. 4 is a view similar to Fig. 3 but showing the blades of the rotor at different pitch angles.

The device 10 comprises a load carrying body 14 which may be cylindrical and it comprises an aerodynamic retarding or braking mechanism connected with the body 14 adjacent one end thereof. As illustrated, the braking mechanism is at the rear of the body as shown in Figs. 1 and 2 or at the top of the body as shown in Figs. 3 and 4. When the braking mechanism is at the top as shown, the body 14 is connected with a separate head 14ª at the bottom thereof and said head preferably has a spike 15 at its lower end for entering the ground to hold the device in upright position after ground engagement. If preferred, the braking mechanism may be at the bottom of the body instead of at the top thereof, as hereinafter described in detail in connection with Fig. 14.

The braking mechanism for the device includes a rotor having similar blades 16, 16 which are connected with the body 14 preferably for rotation relatively thereto in a predetermined direction about a central longitudinal axis. The blades are also otherwise relatively movable as hereinafter explained. As shown, the rotor comprises two blades 16, 16, but three or more blades may be provided if desired. In any event, the blades are equally spaced circumaxially. When the braking mechanism is at the top of the body as shown in Figs. 1 to 13, longitudinal fins 18 are rigidly connected with the body above the upper end thereof, the said fins being carried by a central rigid rod 20 which is preferably nonrotatable. As shown, there are two sets of fins extending radially from the axis of the rod 20 and positioned perpendicularly to each other.

When the device 10 is released from the bomb rack 12 and reaches a position such as that shown in Fig. 2, the forward motion of the device causes the blades 16, 16 to rotate in the said predetermined direction, for reasons to be fully explained. During rotation the blades swing away from each other or outwardly, the swinging movement being at least partly caused by centrifugal force. At the same time the device falls away from the aircraft and as it falls the fins 18 keep the body aligned axially with the air stream. The rotating blades 16, 16 retard or brake the forward movement of the device as hereinafter explained, and said fins 18 prevent or at least minimize rotative movement of the body. The body 14 has a stable trajectory from its initial point of release, this being largely due to the stabilizing effect of said fins. Once a steady state descent velocity has been reached the device remains stable because of the peculiar attributes of the braking mechanism as hereinafter fully set forth.

*More specific description of device*

The construction and manner of operation of an aerial device embodying the invention have been very briefly outlined in connection with Figs. 1 to 4. Reference will now be had more particularly to Figs. 5 to 7 for a more detailed description of the mechanism of the device. For clarity, some of the parts will sometimes be referred to as horizontal and vertical, reference being had to the positions as shown in Figs. 3 and 4, rather than to the positions shown in Figs. 1 and 2. It will be understood that such terms are used in a relative sense only and are not intended to limit the scope of the invention. For convenient comparison with Figs. 6 and 7 and to avoid confusion of terminology, Fig. 5 shows the device in upright position notwithstanding the fact that in use the device does not reach upright position until after the blades have swung outwardly beyond the relative positions shown. As before stated, the rotor may have more than two blades, but for convenience of description it will be assumed that there are only two blades and only two of the parts associated respectively with the blades.

The rotatable blades 16, 16 are connected indirectly with a hub which is rotatable and which is rotatable relatively to the rod 20 when said rod is nonrotatable. The rod 20 when nonrotatable serves as a support for the fins 18 and also as pivot means for the hub and for various other parts. The blades are preferably positioned with their center lines in radial planes and the blades will sometimes be referred to as generally radial. As shown, the hub includes a circular hub plate 24. A combined journal and thrust bearing 26 is preferably interposed between the hub plate 24 and the pivot rod 20. The inner race of the bearing is secured to the rod 20 and the outer race is secured to the plate 24, as for instance by bolts 27, 27. The bearing 26, by reason of its connection with the rod 20, prevents any downward movement of the body 14 relatively to the hub or the hub plate 24, the weight of the body being thus supported directly by the said hub plate 24 and indirectly by the said blades 16, 16.

Rigidly secured to the hub plate 24 are two opposite supports 28, 28 for headed pivot pins 30, 30. The axes *a, a* of the pins 30, 30 are horizontal and they are parallel with each other but nonradial. Hinged on the pins 30, 30 are flapping or sweep hinge pins 32, 32 having axes *b, b*. The hinge pins 32, 32 are sometimes hereinafter referred to as "connecting means" and they are so positioned that their axes *b, b* are tangent to a cylinder concentric with the axis of rotation. Said hinge pins serve as pivotal supports or connecting means for upper blade plates 34, 34 which are pivotally movable about said axes *b, b*. Each said upper blade plate 34 is shown as having a bracket 36 rigidly connected thereto and provided with flanges 38, 38 apertured to receive the corresponding hinge pin 32 and thus provide the required pivotal connection. The two blades 16, 16 are connected respectively with the two plates 34, 34 by means to be hereinafter more fully described. It will be seen that the blades 16, 16 are movable relatively to the hub plate 24 about the main horizontal pitch axes *a, a* which are fixed in relation to the hub plate 24 and are also movable about the sweep axes *b, b* which are adjustable or movable in relation to the hub plate 24. As shown, the center lines of the blades 16, 16 are perpendicular to the pins 32, 32 and to the axes *b, b* thereof, but there may be some variation, particularly in the leading direction, from the perpendicular relationship.

When the parts are in the relative positions shown in Figs. 1 and 5, the hinge pins 32, 32 and the sweep axes *b, b* are horizontal or in any event in a plane perpendicular to the central axis and parallel with the hub plate 24 and the blades 16, 16 extend upwardly, or rearwardly, with their center lines at least approximately in a longitudinal plane extending through the axis of rotation. The blades preferably have a relatively small included cone angle which is in any event less than 60° and which is preferably much smaller, as for instance about 20°. A stop is provided for limiting the movement of the blades upwardly toward each other, and this stop may be carried by the fins 18. As shown the stop is a circular ring 39 secured to the fins near the tops thereof.

A releasable mechanism is provided for initially maintaining said hinge pins or connecting means 32, 32 in their said positions parallel with the hub plate, which positions are hereinafter sometimes referred to as "first" positions. When the device falls away from the aircraft, the said mechanism permits the said hinge pins to move to positions, hereinafter sometimes called "second" positions, wherein they are inclined forwardly and downwardly with respect to the direction of rotation. More specifically, the hinge pins 32, 32 are initially maintained in their said first positions by synchronizer levers 40, 40 pivoted between their ends on horizontal pivot pins carried by supports 42, 42 fixed on the hub plate 24. The outer ends of the levers 40, 40 are pivotally connected with the free ends of the pins 32, 32 by means of clevises 41, 41. Each clevis is rotatable with respect to the main body of the corresponding lever so as to accommodate the change in angle of the pin 32 as it moves out of its said parallel position. The inner ends of the levers 40, 40 are pivotally connected with brackets 44, 44 which are connected with and depend from a collar 46 on the rod 20. The collar 46 has a depending hub 47 and it is vertically movable relatively to the plate 24 but said collar is so connected to the hub plate 24 as to prevent any substantial relative rotative movement. The said levers 40, 40 may serve as means for preventing relative rotative movement of the collar. The said collar 46 is biased for relative downward movement, and as shown it is so biased by a coil spring 48 which surrounds the rod 20 and is above said collar.

For initially holding the releasable mechanism in unreleased position and for subsequently releasing said mechanism, a removable static block 50 is located between the hub plate 24 and one of the brackets 44 on the collar 46. The static block 50 is connected with the aircraft by a static line or cable 52. The block 50 when in place holds the collar 46 in its rear or upper position, and when the collar is in the said position the levers 40, 40 hold the sweep hinge pins 32, 32 in their said first positions in parallelism with the hub plate 24. When the block 50 is withdrawn, the spring 48 moves the collar 46 forwardly or downwardly, and the levers 40, 40 then move the hinge pins 32, 32 to their said inclined or second positions. As shown, the angle of inclination is about 10° but it may be somewhat less than 10°.

Mechanism is provided for synchronizing the sweeping or swinging movements of the blades. As shown, this mechanism includes a synchronizer plate 54 carried by the rod 20 and relatively movable thereon. Preferably the plate 54 is movable rotatively and it is connected with the rod 20 by means of a ball bearing 56 having its inner race rigidly connected with the said rod and having its outer race rigidly connected with the plate. The synchronizer plate 54 is connected with the blades 16, 16 and more specifically with the upper blade plates 34, 34 by means of synchronizer links 58, 58. The upper inner end of each synchronizer link 58 is pivotally connected at 60 with a connector 62 carried by the synchronizer plate 54. As best shown in Figs. 6 and 7, each connector 62 has a vertical pintle 64 and this pintle projects upwardly into a bearing aperture in the synchronizer plate 54. The two pintles 64, 64 are diametrically opposite each other. The lower outer end of each synchronizer link 58 is pivotally connected at 66 with a connector 68 carried by a block 70 connected with or forming a part of the corresponding bracket 36. The connector 68 is connected with the block 70 for pivotal movement about an axis extending transversely of the blade 16 and of the upper blade plate 34, said connector having a pintle 71 projecting in a bearing aperture in said block as shown in Fig. 7. Preferably each link 58 has threaded clevises at its ends which are connected respectively with the connectors 62 and 68, the said clevises being connected with each other by a turnbuckle 72. The turnbuckles 72 for the two links made it possible for the effective lengths of the links to be adjusted. When the blades 16, 16 swing downwardly or upwardly about the sweep axes b, b, the links 58, 58 cause rotative movement of the synchronizer plate 54. The said links and the said plate therefore serve to synchronize the blades as to downward and upward sweeping movements and insure movements of the blades in exact unison and to the same extents.

The spring 48 has been described as a compression spring serving to bias the collar 46 for downward movement. In order that the spring may bias the collar downwardly it must be supported at its upper end and as shown the spring abuts at its upper end against the synchronizer plate 54. The spring 48 may also serve as a torsion spring for rotatively biasing the synchronizer plate. When said spring serves as a torsion spring it has its lower end connected with the nonrotatable collar 46 and it has its upper end connected with the rotatable synchronizer plate 54. The spring 48 may be formed and connected to tend to rotate the synchronizer plate in either direction according to the requirements of a particular design. As shown, it may be assumed that the spring tends to rotate the synchronizer plate in the counterclockwise direction as viewed from the top, that is, in the direction of the arrows appearing on Figs. 5 and 6. When the synchronizer plate is so biased, it tends to swing the blades 16, 16 rearwardly or upwardly and to hold them in their rearmost or uppermost positions as determined by the stop ring 39.

The blades 16, 16 are carried by the before-described upper or first blade plates 34, 34 and provision is made for the pivotal movement of the blades relatively to the hub about pitch axes extending longitudinally of the blades, such last said movement being for the purpose of changing the blade pitches in response to changes in rotative speed. As disclosed, the blades are connected with said blade plates 34, 34 for pivotal movement about secondary pitch axes which extend longitudinally of the blades and which are additional to the main pitch axes a, a. There may be variation in the details of the pivotal connections which provide the secondary pitch axes, but as shown each upper blade plate 34 has depending flanges 74 and 76 located respectively at its inner and outer ends and a pivot pin 78 extends through suitable holes in said flanges. A lower or second blade plate 80 is provided, this plate having upwardly extending flanges 82 and 84 at its inner and outer edges. These flanges 82 and 84 are apertured to receive the pivot pin 78 which thus provides a pivotal connection between the upper or first blade plate 34 and the lower or second blade plate 80. The axes c, c of the two pins 78, 78 constitute the said secondary pitch axes. Preferably and as shown, said pitch axes c, c are near the leading edges of the blades.

The main portion of each blade 16 has a suitable aerofoil shape, such as that shown in Figs. 8 and 9. The blades may be formed of wood but the invention is not so limited. For simplicity of illustration, the drawings show one-piece blades, but the invention is not so limited, and blades having two or more telescopic portions may be substituted. When the blades 16, 16 are formed of wood, the inner portion 86 of each blade is flat and has plain opposite faces and the upper face engages the bottom of the lower blade plate 80. Each blade portion 86 is connected to the lower blade plate 80 by bolts 88, 88, a bearing plate 90 being provided for engaging the heads of the bolts. In the event of damage to a blade it may be readily detached and replaced.

A suitable spring means is provided for biasing the blades for upward movement about their pitch axes c, c, that is, for opposing downward movements to decrease the negative pitch angles. This spring means may be widely varied within the broader aspects of the invention, but preferably individual springs are provided for the respective blades. Suitable details of construction are shown in Figs. 7 to 9.

As best shown in Fig. 8, the lower blade plate 80 is provided adjacent the pivotal axis at 78 with an upstanding flange 92. The upper blade plate 34 is provided at the opposite edge with an upstanding flange 94. A compression spring 96 is interposed between the flanges 92 and 94 so that the two flanges are biased away from each other, the flange 92 thus serving to bias the lower blade plate 80 and the blade for relative movement about the secondary pitch axis c and in the clockwise direction as viewed in Fig. 8. Preferably and as shown, a rod 98 is provided which is pivoted at its right end as viewed in Fig. 8 to ears 100 on the flange 92. Connected with the rod 98 between its ends is a washer 102 adjustable by means of a nut 104, the said spring 96 being interposed between the washer 102 and the flange 94 on the upper blade plate 34.

Relative movement of the lower blade plate 80 and of the blade in the clockwise direction as viewed in Fig. 7 is limited by an adjustable stop 106 which is shown in Figs. 6 and 7. Each upper blade plate 34 has an angle of inclination that is the same as that of the corresponding flapping axis b and which may be about 10° or somewhat less, but the lower blade plate 80 and the blade may have a smaller angle of inclination by reason of the adjustment of the stop 106. As shown in Fig. 8, the angle of inclination of the lower plate 80 and the pitch angle of the blade is about 5°. The term "pitch angle" as herein used refers to the chord angle of the blade with respect to a horizontal line. Inasmuch as the blade, as viewed in Fig. 8, is moving toward the right, the said pitch angle is negative. As hereinafter more fully explained, the blade may move about the axis c from the position shown in Fig. 8 to the full line position shown in Fig. 9 or to the dotted line position shown in Fig. 9.

*More specific description of manner of operation*

When the rotary wing parachute is carried on the aircraft as shown in Fig. 1, the rotor blades 16, 16 are held in the relative positions illustrated with an included angle between them which is preferably about 20°. The said positions are hereinafter sometimes referred to as "first" positions. A suitable stop means, such as the ring 39, prevents the blades from moving additionally toward each other and aerodynamic action due to forward motion holds the blades against said stop means. When the synchronizer plate is biased by the spring 48 in the direction indicated, said plate acts through the synchronizer links 58, 58 so as to tend to hold the blades against the stop means. The static block 50 is in place as shown in Figs. 1 and 5, and the sweep hinge pins 32, 32 are held with their axes b, b in their first positions and parallel with the hub plate 24. As the result of the said positioning of the hinge pins, the blades are held in their said first positions wherein their center lines are in longitudinal planes passing through the axis of rotation, that is, in axial planes.

When the rotary wing parachute is released as shown in Fig. 2, the static line or cable 52 withdraws the static block 50 from its position between the hub plate 24 and one of the connectors 44, and the spring 48 thereupon moves the collar 46 forwardly or downwardly to the relative position shown in Fig. 6. By means of the levers 40, 40 the flapping hinge pins 32, 32 are tilted rearwardly or upwardly about the main pitch axes a, a and are moved to their second positions. The blades 16, 16 have not yet been subjected to forces tending to move them outwardly about their respective flapping hinge pins, but the described tilting of said hinge pins has tilted the blades forwardly with respect to the predetermined direction of rotation, the blades being moved to the relative positions shown in Fig. 2. In these positions the blades have their center lines in planes inclined forwardly from said axial planes. Furthermore, by reason of the angles of the sweep axes b, b and by reason of the outward inclination of the blades, said blades have small negative pitch angles. The relative blade positions shown in Fig. 2 are hereinafter sometimes referred to as "second" positions.

When the blades are in the first positions shown in Fig. 1, they did not tend to rotate as their center lines were opposite the axis of rotation and for a two-blades rotor the center lines were opposite each other. Obviously, any air pressure or air impact tending to swing the blades inwardly merely pressed them against the stop ring 39. Inasmuch as the flapping axes b, b were parallel with the hub plate, the blades were without pitch. However, when the blades are tilted to the second positions shown in Fig. 2, their active outer portions are no longer opposite the axis of rotation, the center lines of the blades being in planes inclined forwardly from the axis of rotation. Under these conditions, air impact tending to swing the blades inwardly establishes a force couple which causes them to rotate in the predetermined direction as indicated. The stop ring 39 prevents the air pressure on the blades from moving them inwardly. The rotation of the blades in the said predetermined direction is assisted by the above-mentioned initial small negative pitch of the blades.

The rotary wing parachute device starts to fall as soon as it is free from the aircraft as shown in Fig. 2. As the device falls the said fins 18 keep the body aligned axially with the air stream. At the same time the blades 16, 16 have started to rotate in the predetermined direction as already explained. The speed of rotation rapidly increases and centrifugal action causes the blades to swing or sweep outwardly from their said second positions as shown in Fig. 2 to relative positions such as those shown in Fig. 3. The relative position shown in Fig. 3 are hereinafter sometimes referred to as "third" positions, the term referring only to the general attitude of the blades and not to their pitch angles. In sweeping from their second positions as shown in Fig. 2 to their third positions as shown in Fig. 3, the blades have turned the synchronizer plate in the clockwise direction and the said plate and the said links 58, 58 have maintained the blades at equal coning angles at all times. When the spring 48 biases the plate 54 for counterclockwise movement, the above-mentioned rotative movement of said plate has been in opposition to said spring.

As the blades swing from the Fig. 2 or second positions to their Fig. 3 or third positions, the before-mentioned force couple resulting from air impact becomes progressively less effective for maintaining rotation. However, the driving force produced by the negative pitch angles of the blades relative to the plane of rotation become progressively greater, and in the Fig. 3 positions the said negative angles are at their maximum as determined in part by the angles of inclination of the sweep axes b, b. Autorotation in the predetermined direction is maintained by reason of the said negative pitch angles as hereinafter more fully explained.

The outward and downward sweeping movement of the blades by centrifugal force is resisted by the aerodynamic lift acting upon the blades and positions are reached wherein the two forces balance each other. As shown in Fig. 3, the blades have reached limiting positions with a coning angle of about 160° between them. This coning angle varies with conditions and it may ordinarily be somewhat greater than that shown.

The maximum negative pitch angles of the blades are determined by the adjustment of the stops 106, and as shown in Fig. 8 the maximum negative pitch angle for each blade is about 5°. By stop adjustment this angle may be varied to a considerable extent. The maximum negative pitch angles of the blades are so chosen that, if retained, they would cause descent and autorotation at rates considerably greater than are desirable. However, means are provided which are automatically dependent upon the speed of autorotation for pivotally moving the blades about their longitudinal pitch axes c, c so as to change the pitch angles to such extents as are necessary to maintain autorotation at any speed within reasonable limits. This automatic means may decrease the negative pitch angles to zero, as shown by full lines in Fig. 9, and may then move the blades to small positive pitch angles as shown by dotted lines in Fig. 9 and as shown by full lines in Fig. 4. Each hereinafter contained reference to a blade movement for decreasing the negative pitch angle is intended, unless otherwise qualified, to include when necessary not only a movement sufficient to decrease the said angle to zero but also a continued movement which provides a positive pitch angle.

The automatic speed responsive means for pivotally moving the blades to change the pitch angles thereof may be widely varied, but it is preferably automatically dependent upon varying centrifugal action of said blades as the result of variations in the speed of autorotation. It has been heretofore proposed to effect pitch adjustment by means of centrifugally acting weights additional to the blades, but in accordance with the present invention additional weights are avoided and dependence is placed entirely upon the centrifugal action of the blades themselves. As shown, the last said automatically acting means resides in the relationship between the centers of mass of the blades, the centers of lift of the blades, and the pivotal axes b, b and c, c.

As has been stated, the lift on the blades opposes the centrifugal force and maintains them at an included coning angle which is shown in Figs. 3 and 4 as being about 160° for ratio of descent of approximately 20 to 30 feet per second. This coning angle results from a balance between the aerodynamic lift forces tending to move the blades upwardly and inwardly and centrifugal forces tending to move the blades outwardly and downwardly.

Fig. 10 schematically shows the forces that effect automatic speed responsive blade adjustment, but no attempt has been made to show said forces quantitatively. The centrifugal force acting on the blade is indicated at d, said force being represented as acting at the center of mass e which is represented as being on the longitudinal line e—f of the blade. The said line e—f is spaced in the trailing direction from the secondary pitch axis c by a distance g. The centrifugal force e has a component h normal to the blade. The lift forces on one blade or the components thereof in a vertical plane are indicated generally at i, the effective lift forces being represented as acting along a center line j—k. The blade is preferably so constructed and shaped that the lift center line j—k is spaced in the leading direction from the line e—f passing through the center of mass, the distance between the lines e—f and j—k being indicated at l. When the pitch axis c is near the leading edge of the blade, as is preferred, the lift center line j—k is spaced in the trailing direction from said pitch axis c by a distance g substantially less than the distance between the axis c and the line e—f. The line e—f may be spaced from the leading edge of the blade by a distance that is about 40% of the blade width and the line j—k may be spaced from the leading edge of the blade by a distance that is about 25% of the blade width, but the invention is not necessarily so limited.

As concerns the angular positions of the blades with respect to the horizontal, the said lift forces i are balanced by the normal component h of the centrifugal force d. These opposing forces serve to maintain the blade at an angle which may be 10° or less but which is considerably exaggerated in Fig. 10.

If the axis c were in register with the line j—k the upwardly acting lift forces i would have no moment arm and the downwardly acting normal component h of the centrifugal force d would be unopposed and would tend to turn the blade about the axis c in the direction indicated by the arrow m, that is, in the counterclockwise direction as shown in Fig. 11 so as to move the trailing edge of the blade downwardly. Actually, however, the downwardly acting force h is not unopposed but is opposed by the approximately equal upwardly acting lift forces $i$. But the lift forces $i$ act nearer to the axis $c$ and therefore only partly offset the turning moment of the force $h$. The two oppositely acting forces $h$ and $i$ can be regarded as constituting a force couple which is resolved as a positive pitching moment on the blade and which tends to turn said blade about the secondary axis $c$. The said force couple will be more readily apparent from Fig. 11, and it will be evident that it tends to turn the blade in the direction $m$ to move the trailing edge downwardly. The lift forces and the centrifugal force are proportionate to speed of rotation and therefore the turning force of the said couple is proportionate to speed of rotation.

By reference to Figs. 8 and 9 it will be evident that turning of the blade in the last said direction by the said force couple is resisted by the spring 96. By means of the nut 104 the spring 96 can be adjusted to vary its resistance to the turning of the blade. As has been stated, the effectiveness of the force couple $h—i$ varies directly with the speed of rotation. With other conditions unchanged, the extent of spring compression and of blade turning will also vary directly with the speed. The extent of turning for any selected speed can be determined by the adjustment of the springs.

When the blades have any reasonable negative pitch angles there will be continued autorotation and the descent of the device will be retarded, and the same condition prevails with zero pitch angles or with small positive pitch angles. The direction of rotation is indicated by the arrows $n$ in Figs. 8 and 9. Due to the continuing descent of the device the effective direction of the encountered air stream may be such as that indicated by the arrow $o$ in said Figs. 8 and 9. For continued autorotation it is merely necessary that the lift forces on the blades have components which act in the driving direction, this being in accord with well-known principles of autorotation. By reason of the direction of the encountered air stream each blade will have such a force, in the driving direction even when the blade has a small positive pitch angle. By adjustment of the springs 96, 96 the extent of pitch changes may be varied and the blades can be caused, by reason of the described forces thereon, to assume some particular pitch angle, as for instance the positive pitch angle of about 2° as shown by dotted lines in Fig. 9. Thus the device can be set for autorotation and for descent at any rates within reasonable limits.

While reference has been made to particular pitch angles for a selected condition, it will be understood that such particular angles may not be uniformly maintained and that there may be minor indeterminate variation therefrom. By way of example it may be assumed that for a given condition the blades should be at the positive pitch angles shown by dotted lines in Fig. 9. When the rotor rotates at a speed slightly greater than the selected speed, there is an increased lift force and an increased centrifugal force, and this may result in the turning of the blades to positive pitch angles slightly greater than required. Such greater positive pitch angles would reduce the rotative speed. With reduced relative speed the last above-described conditions would be reversed and the blades would be turned to positive pitch angles slightly smaller than required. Thereupon the speed of rotation would be again increased. These conditions may be repeated when any external unsetting forces are encountered.

So far as heretofore described, the automatic speed responsive adjustment of the blades is around the secondary pitch axes $c, c$, such adjustment being controlled by the springs 96, 96 which are compressed as the blades are turned about said axes by the said force couples $l—d$. However, the speed responsive adjustment of the blades may be at least partially around the main pitch axes $a, a$.

From the prior description of the mechanism and from the explanation of the force couples $l—d$, as indicated in Fig. 11, it will be clear that said force couples would tend to move the blades about the main pitch axes $a, a$ if the blades were rigidly connected with the upper blade plates 34, 34, the secondary pitch axes $c, c$ being thus eliminated. Speed responsive turning of the blades about the axes $a, a$ would be opposed by the compressed spring 48 which acts through the levers 40, 40 to tend to hold the hinge pins 32, 32 and said upper blade plates 34, 34 in the inclined positions shown in Fig. 6 wherein the trailing edges of the plates are raised. With a proper force balance between the said couple $l—d$ and the said spring 48, the spring would yield in response to the action of said couples $l—d$, so as to permit the blades to move about the axes $a, a$, in the direction of the arrow $m$ in Fig. 11.

As shown, the blades are not rigidly connected with the upper blade plates 34, 34, but are pivotally connected therewith at the secondary axes $c, c$. However, the springs 96, 96 which resist turning about the axes $c, c$ and the spring 48 which resists turning about the axes $a, a$, may be so related to each other that turning takes place not only about the axes $c, c$ but also about the axes $a, a$. For instance, the springs 96, 96 may be of such strength and may be so adjusted that they offer a predetermined resistance to further turning about the axes $c, c$ when the blades reach predetermined positions, such as shown by full lines in Fig. 9. The said predetermined resistance offered by the springs 96, 96 may be such as to overcome the resistance offered by the spring 48 and to thus cause any additional speed responsive turning of the blades to be about the axes $a, a$ in opposition to said spring 48. Referring again to Fig. 9, it may be assumed, by way of illustration, that speed responsive turning to the full line position has been about the axis $c$ in opposition to the spring 96 and that additional speed responsive turning from the full line position to the dotted line position has been about the axis $a$ in opposition to the spring 48.

*Alternative device shown in Figs. 12 and 13*

It may be desirable to provide mechanism for synchronizing the pivotal movements of the blades about the axes $c, c$ which movements effect the changing of the blade pitches. Such synchronizing mechanism when required may be constructed as shown in Figs. 12 and 13 which are similar respectively to Figs. 4 and 10 except for the added synchronizing mechanism.

Carried by the rod 20 above the synchronizer plate 54 is a second synchronizer plate 108. The plate 108 is similar to the plate 54 and is similarly mounted and a detailed description is therefore unnecessary. Links 110, 110 connect the plate 108 with the blades 16, 16 near the trailing edges thereof. As shown, each link engages at its upper inner end with a connector 112 pivotally mounted on the plate 108. Each link 110 engages at its lower outer end with a connector 114 carried by the plate 90 at the trailing edge thereof, a suitable universal joint 116 being provided between said link and said connector.

The described synchronizing mechanism insures uniformity of movement of the two blades 16, 16 about the said axes $c, c$, notwithstanding any minor frictional differences or any minor differences in the adjustment of the springs 96, 96.

*Alternative device shown in Fig. 14*

It has been stated that the braking mechanism may be at the top of the body or at the bottom thereof but, as thus far illustrated and described, the braking mechanism is at the top. Fig. 14 shows an alternative device wherein the braking mechanism is at the bottom instead of at the top. The details of the mechanism of the braking device are or may be exactly as previously described and the manner of operation is or may be exactly as previously described.

The device shown in Fig. 14 has an alternative body 118 which may be similar to the body 14. The vertical rod 20 of the braking mechanism is rigidly connected at the top thereof with the said body 118 and said rod projects downwardly from the body. Rigidly secured to the lower end of the rod 20 is a head 120 which is similar to the before-described head 14a and which carries a spike 122 which is similar to the spike 15. The bearing 26 of the braking mechanism has its inner nonrotatable race secured to the rod 20 and has its outer rotatable race secured to the hub plate 24 as previously described.

In lieu of the fins 18 for keeping the body axially aligned with the air stream, there is provided a cylindrical fin 124 which accomplishes the same result. The cylindrical fin 124 is or may be formed of sheet metal and it has a diameter considerably greater than that of the body. The cylindrical fin 124 is spaced outwardly from the body and is connected therewith by two or more longitudinal ribs 126. Preferably the cylindrical fin 124 is provided with an annular bead 128 at the bottom thereof, this bead serving as a stop for the blades 16, 16 and having exactly the same function as the before-described stop ring 39.

The invention claimed is:

1. In an aerial device of the class described, the combination of a body adapted to carry a load, a rotor connected with the body for rotation about a central normally vertically axis and in a predetermined direction which rotor includes a hub and also includes a plurality of generally radial blades connected with the hub and equally spaced circumaxially, said blades having equal negative pitch angles providing suitable angles of air attack for causing autorotation of said rotor in said direction as the device descends, means connecting the blades with the hub for pivotal movements about pitch axes extending generally longitudinally of said blades, spring means connected with said blades for opposing movements thereof about their said pitch axes and in the direction to decrease their negative pitch angles, and means automatically dependent upon varying centrifugal action of said blades as the result of variations in the speed of autorotation for pivotally moving the blades about their said pitch axes so as to decrease said negative pitch angles in accordance with increased rotative speeds and so as to increase said negative pitch angles in accordance with decreased rotative speeds, the decreases and increases in the negative pitch angles being respectively opposed and assisted by said spring means.

2. An aerial device as set forth in claim 1, wherein stops are provided respectively for said blades to limit movements thereof by said springs, said stops being adjustable to vary said maximum negative pitch angles.

3. In an aerial device of the class described, the combination of a body adapted to carry a load, a rotor connected with the body for rotation about a central normally vertical axis and in a predetermined direction which rotor includes a hub and also includes a plurality of generally radial blades connected with the hub and equally spaced circumaxially, said blades extending outwardly and upwardly from the hub and having equal negative pitch angles providing suitable angles of air attack for causing autorotation of said rotor in said direction as the device descends, and means connecting the blades with the hub for pivotal movements about pitch axes extending generally longitudinally of said blades which axes are spaced in the leading directions from the centers of mass of the blades so that normal components of centrifugal forces acting on said blades tend to turn them about said pitch axes and in the directions to move the trailing edges downwardly with resultant decreased negative pitch angles.

4. An aerial device as set forth in claim 3, wherein spring means is provided for opposing the tendency of the blades to turn about said pitch axes and in said directions.

5. In an aerial device fo the class described, the combination of a body adapted to carry a load, a rotor connected with the body for rotation about a central normally vertical axis and in a predetermined direction which rotor includes a hub and also includes a plurality of generally radial blades connected with the hub and equally spaced circumaxially, said blades extending outwardly and upwardly from the hub and having equal negative pitch angles providing suitable angles of air attack for causing autorotation of said rotor in said direction as the device descends, and means connecting the blades with the hub for pivotal movements about pitch axes extending generally longitudinally of said blades, said blades being so constructed and shaped that the centers of the effective lines of aerodynamic lift forces thereon are spaced in the leading direction from the centers of mass thereof so that the downwardly acting normal components of the centrifugal forces at the centers of mass and the upwardly acting lift forces at the centers of the lift lines constitute force couples tending to turn said blades about said pitch axes and in the directions to move the trailing edges downwardly with resultant decreased negative pitch angles.

6. An aerial device as set forth in claim 5, wherein the pitch axes of the blades are near the leading edges thereof.

7. In an aerial device of the class described, the combination of a body adapted to carry a load, a hub connected with the body for rotation about a central normally vertical axis and in a predetermined direction, a plurality of blade plates equally spaced circumaxially and connected with the hub for free pivotal movements about transverse sweep axes tangent to a cylinder concentric with said central axis, a plurality of generally radial blades connected respectively with said blade plates for pivotal movements about pitch axes extending generally longitudinally of said blades, said blades being movable about said sweep axes in unison with said blade plates and said blades having equal negative pitch angles providing suitable angles of air attack for causing autorotation of said blades and hub in said predetermined direction as the device descends, and means automatically dependent upon varying centrifugal action of said blades as the result of variations in the speed of autorotation for pivotally moving the blades relatively to said blade plates and about their said pitch axes so as to decrease said negative pitch angles in accordance with increased rotative speeds and so as to increase said negative pitch angles in accordance with decreased rotative speeds.

8. In an aerial device of the class described, the combination of a body adapted to carry a load, a hub connected with the body for rotation about a central normally vertical axis and in a predetermined direction, a plurality of blade plates equally spaced circumaxially and connected with the hub for free pivotal movements about transverse sweep axes tangent to a cylinder concentric with said central axis, and a plurality of generally radial blades connected respectively with said blade plates for pivotal movements about pitch axes near the leading edges of the blades and extending generally longitudinally of said blades which blades are movable about said sweep axes in unison respectively with said blade plates and have equal negative pitch angles providing suitable angles of air attack for causing autorotation of said blades and hub in said direction as the device descends, said blades upon autorotation being subject to centrifugal forces which tend to move them and said plates outwardly and downwardly about said sweep axes and being shaped and arranged to provide aerodynamic lifting forces which oppose said centrifugal forces and maintain said blades and said plates in upwardly and outwardly inclined coning positions and said blades having their centers of mass spaced in the trailing directions from said longitudinal pitch axes so that normal components if said centrifugal forces serve to turn said blades relatively to said plates about said pitch axes and in the directions to move the trailing edges of the blades downwardly with resultant decreased negative pitch angles.

9. An aerial device as set forth in claim 8, wherein the blades are rigidly connected respectively with a plurality of second blade plates, wherein said second blade plates are connected with the first said blade plates for pivotal movement about said longitudinal pitch axes, wherein springs are provided each of which is connected with both of the two blade plates associated with a corresponding blade, and wherein one of said two blade plates associated with each blade carries an adjustable stop for limiting movements of the second blade plates and the blades in the said direction for increasing the negative angles of the blades.

10. In an aerial device of the class described, the combination of a body adapted to carry a load, a hub connected with the body for rotation about a central normally vertical axis and in a predetermined direction, a plurality of blade plates equally spaced circumaxially and connected with the hub for free pivotal movements about transverse sweep axes tangent to a cylinder concentric with said central axis, and a plurality of generally radial blades connected respectively with said blade plates for pivotal movements about pitch axes extending generally longitudinally of said blades which blades are movable about said sweep axes in unison respectively with said blade plates and have equal negative pitch angles providing suitable angles of air attack for causing autorotation of said blades and hub in said direction as the device descends, said blades upon autorotation being subject to centrifugal forces which tend to move them and said plates outwardly and downwardly about said sweep axes and being subject to aerodynamic lifting forces which oppose said centrifugal forces and maintain said blades and said plates in upwardly and outwardly inclined positions and said blades being so constructed and shaped that the centers of the effective lines of aerodynamic lift forces thereon are spaced in the leading direction from the centers of the mass thereof so that the downwardly acting normal components of the centrifugal forces at the centers of mass and the upwardly acting lift forces at the centers of the lift lines constitute force couples tending to turn said blades relatively to said plates about said pitch axes and in the directions to move the trailing edges downwardly with resultant decreased negative pitch angles.

11. In an aerial device of the class described, the combination of a body adapted to carry a load, a hub connected with the body for rotation about a central normally vertical axis and in a predetermined direction, a plurality of blade plates equally spaced circumaxially and connected with the hub for free pivotal movements about transverse sweep axes tangent to a cylinder concentric with said central axis, and a plurality of generally radial blades connected respectively with said blade plates for pivotal movements about pitch axes near the leading edges of the blades and extending generally longitudinally of said blades which blades are movable about said sweep axes in unison respectively with said blade plates and have equal negative pitch angles providing suitable angles of air attack for causing autorotation of said blades and hub in said direction as the device descends, said blades upon autorotation being subject to centrifugal forces which tend to move them and said plates outwardly and downwardly about said sweep axes and being subject to aerodynamic lifting forces which oppose said centrifugal forces and maintain said blades and said plates in upwardly and outwardly inclined positions and said blades having their centers of mass spaced in the trailing directions from said longitudinal pitch axes and said blades being further so constructed and shaped that the effective lines of aerodynamic lift forces on said blades are spaced in the leading direction from said centers of mass so that the downwardly acting normal components of the centrifugal forces at the centers of mass and the upwardly acting lift forces at the lift lines constitute force couples tending to turn said blades about said axes and in the directions to move the trailing edges of the blades downwardly with resultant decreased negative pitch angles.

12. In an aerial device of the class described, the combination of a body adapted to carry a load, a central vertical pivot rod rigidly connected with the body, a hub freely rotatable on the rod in a predetermined direction and held against relative vertical movement, a plurality of blade plates equally spaced circumaxially and connected with the hub for free pivotal movements about sweep axes tangent to a cylinder concentric with said central axis, a plurality of generally radial blades connected respectively with said blade plates for pivotal movements about pitch axes extending longitudinally of said blades which blades are movable about said sweep axes in unison respectively with said blade plates and have equal negative pitch angles providing suitable angles of air attack for causing autorotation of said blades and hub in said direction as the device descends, centrifugally acting means automatically dependent upon variations in the speed of autorotation for pivotally moving the blades about their said longitudinally pitch axes so as to decrease said negative pitch angles in accordance with increased rotative speeds and so as to increase said negative pitch angles in accordance with decreased rotative speeds, a first synchronizing mechanism connecting the blade plates with each other to insure uniformity of movement of said plates and the corresponding blades about said sweep axes, and a second synchronizing mechanism connecting the blades with each other independently of the blade plates to insure uniformity of turning movements of said blades about said pitch axes.

13. An aerial device as set forth in claim 12, wherein said first synchronizing mechanism comprises a synchronizer plate carried by said rod and movable relatively thereto and also comprises a plurality of similar downwardly and outwardly inclined links pivotally connected at their inner ends to said synchronizer plate at positions equally spaced circumaxially and pivotally connected at their outer ends to said blade plates at positions equally spaced from the axis so that said synchronizer plate and said links insure uniformity of movement of said blade plates and the corresponding blades about said flapping axes, and wherein said second synchronizing mechanism comprises a second synchronizer plate carried by said rod and movable relatively thereto and also comprises a plurality of similar downwardly and outwardly inclined links pivotally connected at their inner ends to said second synchronizer plate at positions equally spaced circumaxially and pivotally connected at their outer ends to said blades at positions adjacent the trailing edges of the blades and equally spaced from the central axis so that said second synchronizer plate and the second said links insure uniformity of turning movements of said blades about said pitch axes.

14. In an aerial device of the class described, the combination of a body adapted to carry a load, a central vertical pivot rod rigidly connected with the body, a hub freely rotatable on the rod in a predetermined direction and held against relative vertical movement, a plurality of generally radial blades equally spaced circumaxially and connected with the hub for free pivotal movements about transverse sweep axes tangent to a cylinder concentric with said central axis which blades have equal pitch angles providing suitable angles of air attack for causing autorotation of said blades and hub in said direction as the device descends, and means rigidly connected with said rod and spaced from said hub for engaging the blades to limit inward movement of said blades.

15. In an aerial device of the class described, the combination of a body adapted to carry a load, a central vertical pivot rod rigidly connected with the body and extending upwardly therefrom, a hub freely rotatable on the rod above the body and held against relative vertical movement, a plurality of generally radial blades equally spaced circumaxially and connected with the hub for free pivotal movements about transverse sweep axes tangent to a cylinder concentric with said central axis which blades have equal negative pitch angles providing suitable angles of air attack for causing autorotation of said blades and hub in said direction as the device descends, air engaging fins rigidly connected with said rod above said hub and adapted to maintain said device in alignment with the air stream during initial portion of descent, and means on said fins for engaging the blades to limit upward and inward movement of said blades.

16. An aerial device as set forth in claim 15 wherein said movement limiting means on said fins is a horizontal circular ring.

17. In an aerial device of the class described, the combination of a body adapted to carry a load, a hub connected with the body for rotation about a central normally vertical axis and in predetermined direction, a plurality of blade plates equally spaced circumaxially and connected with the hub for free pivotal movements about transverse sweep axes tangent to a cylinder concentric with said central axis which sweep axes are inclined forwardly and downwardly with respect to the direction of rotation, a plurality of generally radial blades connected respectively with said blade plates for pivotal movements about pitch axes extending generally longitudinally of said blades, said blades being movable about said sweep axes in unison with said blade plates and said blades having equal negative pitch angles providing suitable angles of air attack for causing autorotation of said blades and hub in said direction as the device descends, and centrifugally acting means automatically dependent upon variations in the speed of autorotation for pivotally moving the blades relatively to said blade plates about their said pitch axes so as to decrease said negative pitch angles in accordance with increased rotative speeds and so as to increase said negative pitch angles in accordance with decreased rotative speeds.

18. An aerial device as set forth in claim 17, including stops for limiting pivotal movements of said blades about said pitch axes in positions wherein the blades have negative pitch angles substantially less than the angles of inclination of said sweep axes.

19. In an aerial device of the class described, the combination of a body adapted to carry a load, a hub connected with the body for rotation about a central normally vertical axis and in a predetermined direction, a plurality of blade plates connected with the hub for free pivotal movements about transverse sweep axes tangent to a cylinder concentric with said central axis which sweep axes are inclined forwardly and downwardly with respect to the direction of rotation, a plurality of generally radial blades pivotally connected respectively with said blade plates for pivotal movements about pitch axes near the leading edges of the blades and extending generally longitudinally of said blades which blades are movable about said sweep axes in unison respectively with said blade plates and have equal negative pitch angles providing suitable angles of air attack for causing autorotation of said blades and hub in said direction as the device descends, said blades upon autorotation being subject to centrifugal forces which tend to move them and said plates outwardly and downwardly about said sweep axes and being subject to aerodynamic lifting forces which oppose said centrifugal forces and maintain said blades and said plates in upwardly and outwardly inclined positions and said blades having their centers of mass spaced in the trailing directions from said longitudinal pitch axes so that normal components of said centrifugal forces tend to turn said blades relatively to said plates about said pitch axes and in the directions to move the trailing edges of the blades downwardly with resultant decreased negative pitch angles, and means for limiting turning movements of said blades about said pitch angles in positions wherein the blades have negative pitch angles substantially less than the angles of inclination of said sweep axes.

20. In an aerial device of the class described, the combination of a body adapted to carry a load, a hub connected with the body for rotation about a central normally vertical axis and in a predetermined direction, a plurality of blade plates connected with the hub for free pivotal movements about transverse sweep axes tangent to a cylinder concentric with said central axis which sweep axes are inclined forwardly and downwardly with respect to the direction of rotation, a plurality of generally radial blades pivotally connected respectively with said blade plates for pivotal movements about pitch axes extending generally longitudinally of said blades which blades are movable about said sweep axes in unison respectively with said blade plates and have equal negative pitch angles providing suitable angles of air attack for causing autorotation of said blades and hub in said direction as the device descends, said blades upon autorotation being subject to centrifugal forces which tend to move them and said plates outwardly and downwardly about said sweep axes and being subject to aerodynamic lifting forces which oppose said centrifugal forces and maintain said blades and said plates in upwardly and outwardly inclined positions and said blades being so constructed and shaped that the centers of the effective lines of aerodynamic lift forces thereon are spaced in the leading direction from the centers of mass thereof so that the downwardly acting normal components of the centrifugal forces at the centers of mass and the upwardly acting lift forces at the centers of the lift lines constitute force couples tending to turn said blades relatively to said plates about said pitch axes and in the directions to move the trailing edges downwardly with resultant decreased negative pitch angles.

21. In an aerial device of the class described, the combination of a body adapted to carry a load, a hub connected with the body for rotation about a central normally vertical axis and in a predetermined direction, a plurality of blade plates connected with the hub for free pivotal movements about transverse sweep axes tangent to a cylinder concentric with said central axis which sweep axes are inclined forwardly and downwardly with respect to the direction of rotation, a plurality of generally radial blades pivotally connected respectively with said blade plates for pivotal movements about pitch axes near the leading edges of the blades and extending generally longitudinally of said blades which blades are movable about said sweep axes in unison respectively with said blade plates and have equal negative pitch angles providing suitable angles of air attack for causing autorotation of said blades and hub in said direction as the device descends, said blades upon autorotation being subject to centrifugal forces which tend to move them and said plates outwardly and downwardly about said sweep axes and being subject to aerodynamic lifting forces which oppose said centrifugal forces and maintain said blades and said plates in upwardly and outwardly inclined positions and said blades having their centers of mass spaced in the trailing directions from said longitudinal pitch axes and said blades being further so constructed and shaped that the effective lines of aerodynamic lift forces on said blades are spaced in the leading direction from said centers of mass so that the downwardly acting normal components of the centrifugal forces at the centers of mass and the upwardly acting lift forces at the lift lines constitute force couples tending to turn said blades about said axes and in the directions to move the trailing edges of the blades downwardly with resultant decreased negative pitch angles, and means for limiting turning movements of said blades about said pitch angles in positions wherein the blades have negative pitch angles substantially less than the angles of inclination of said sweep axes.

22. In an aerial device of the class described, the combination of a body adapted to carry a load, a hub connected with the body for rotation about a central normally vertical axis and in a predetermined direction, a plurality of blades equally spaced circumaxially and connected with the hub for rotation therewith and for sweeping movements relatively thereto about transverse sweep axes tangent to a cylinder concentric with said central axis, said blades initially having a relatively small included coning angle and said blades initially having first positions wherein their center lines are at least approximately in axial planes passing through the axis of rotation, an element engaging the hub and connectible with a carrier for the device and movable relatively to said hub when the device is released from the carrier, and means dependent upon the relative movement of said element for moving the blades from said first positions to second positions wherein their center lines are inclined forwardly from said axial planes so that the blades in said second positions are acted upon by the air to start rotation in the said predetermined direction.

23. In an aerial device of the class described, the combinaton of a body adapted to carry a load, a hub connected wth the body for rotaton about a central normally vertical axis and in a predetermined direction, a plurality of connecting means on the hub which are equally spaced circumaxially and which provide a plurality of transverse sweep axes tangent to a cylinder concentric with said central axis, said connecting means having first positions wherein their said sweep axes are at least approximately in a plane perpendicular to said central axis and said connecting means having second positions wherein their said sweep axes are inclined downwardly and forwardly with respect to the direction of rotation, means for releasably holding said connecting means in their said first positions, means serving upon the release of said holding means for moving the connecting means relatively to the hub from their said first positions to their said second positions, and a plurality of blades connected respectively with said connecting means for rotation with said hub and for sweeping movements about the sweep axes of said connecting means which blades with the connecting means in their first said positions have a relatively small included coning angle and are in first positions wherein their center lines are at least approximately in axial planes passing through the axis of rotation, said blades being movable from their said first positions to second positions upon movement of the connecting means from their said first positions to their said second positions and said blades in their second positions having their center lines inclined forwardly from said axial planes so that the blades in said second positions are acted upon by the air to start rotation in the said predetermined direction.

24. An aerial device as set forth in claim 23, wherein the means for moving the connecting means to their second positions includes a spring continually biasing said means to said positions, and wherein the means for holding said connecting means in their first positions includes a block connectible to a carrier for the device and initially in a position to prevent movements of said connecting means by said spring, said block being automatically withdrawn from its said movement preventing position when the device is released from the carrier.

25. In an aerial device of the class described, the combination of a body adapted to carry a load, a central vertical pivot rod rigidly connected with the body, a hub freely rotatable on the rod in a predetermined direction and held against relative vertical movement, a plurality of hinge pins which are equally spaced circumaxially and each of which is pivotally connected at one end thereof to the hub for movement about a horizontal axis, a vertically movable collar on the rod, a plurality of levers pivotally connected between their ends to the hub, each lever being connected at one end to a corresponding hinge pin and each lever being connected at the opposite end to said collar, a spring biasing the collar for downward movement and serving by reason of the levers to bias the hinge pins for upward movement about their pivotal axes to positions wherein they are inclined downwardly and forwardly with respect to the direction of rotation, an element initially positioned to prevent downward movement of the collar and serving by reason of the levers to hold the hinge pins in approximately horizontal positions, said element being movable from its initial position to enable said spring to swing said hinge pins upwardly to their said inclined positons, and a plurality of blades connected respectively with said hinge pins for rotation with said hub and for sweeping movements about said pins which blades initially have a relatively small included coning angle, said blades having their center lines at least approximately in axial planes passing through the axis of rotation when the hinge pins are in their approximately horizontal positions and said blades having their center lines inclined forwardly from said axial planes to cause rotation in said predetermined direction when the hinge pins are swung to their said inclined positions.

26. In an aerial device of the class described, the combination of a body adapted to carry a load, a hub connected with the body for rotation about a central normally vertical axis and in a predetermined direction, a plurality of blade plates equally spaced circumaxially and connected with the hub for rotation therewith and for sweeping movements relatively thereto about transverse sweep axes tangent to a cylinder concentric with said central axis, a plurality of blades connected respectively with said blade plates for sweeping movements therewith, said blades being initially in first positions wherein they have a relatively small included coning angle and wherein their center lines are at least approximately in axial planes passing through the axis of rotation, an element connectible with a carrier for the device and relatively movable when the device is released from the carrier, means dependent upon the relative movement of said element for moving the blades from said first positions to second positions wherein their center lines are inclined forwardly from said axial planes so that the blades in said second positions are acted upon by the air to start rotation in said predetermined direction with resultant sweeping movements to third positions wherein they have a relatively large included coning angle, means connecting said blades for pivotal movements about pitch axes extending longitudinally of said blades, means operative with the blades in their said third positions for initially holding said blades in positions wherein they have equal negative pitch angles providing suitable angles of air attack for causing autorotation in said predetermined direction as the device descends, and means automatically dependent upon variations in the speed of autorotation for pivotally moving the blades relatively to said hub and about their said longitudinal pitch axes so as to decrease said negative pitch angles in accordance with increased rotative speeds and so as to increase said negative pitch angles in accordance with decreased rotative speeds.

27. An aerial device as set forth in claim 26, wherein said means automatically dependent upon variations in the speed of autorotation for pivotally moving the blades relatively to said blade plates resides in the construction and shape of the blades so that the downwardly acting normal components of the centrifugal forces at the centers of mass and the upwardly acting lift forces at the centers of the lift lines constitute force couples tending to turn said blades relatively to said plates about said pitch axes and in the directions to move the trailing edges downwardly with resultant decreased negative pitch angles.

28. In an aerial device of the class described, the combination of a body adapted to carry a load, a hub connected with the body for rotation about a central normally vertical axis and in a predetermined direction, a plurality of blade plates equally spaced circumaxially and connected with the hub for rotation therewith and for sweeping movements relatively thereto about transverse sweep axes tangent to a cylinder concentric with said central axis, a plurality of blades connected respectively with said blade plates for sweeping movements therewith, said blades being initially in first positions wherein they have a relatively small included coning angle and wherein their center lines are at least approximately in axial planes passing through the axis of rotation, an element connectible with a carrier for the device and relatively movable when the device is released from the carrier, means dependent upon the relative movement of said element for moving the blades from said first positions to second positions wherein their center lines are inclined forwardly from said axial planes so that the blades in said second positions are acted upon by the air to start rotation in said predetermined direction with resultant sweeping movements of said blades to third positions wherein they are outwardly and upwardly inclined and have a relatively large included coning angle, and means connecting said blades to said blade plates in positions wherein they have equal negative pitch angles providing suitable angles of air attack for maintaining autorotation in said predetermined directions as the device descends which means provides for pivotal movements of said blades about pitch axes extending longitudinally of said blades and spaced in the leading direction from the centers of mass of said blades so that during autorotation normal components of centrifugal forces acting upon the blades serve to turn them relatively to said plates about said pitch axes and in the directions to move the trailing edges of the blades downwardly with resultant decreased negative pitch angles.

29. In an aerial device of the class described, the combination of a body adapted to carry a load, a hub connected with the body above the top thereof for free rotation relatively thereto about a central normally vertical axis and in a predetermined direction, a plurality of blade plates equally spaced circumaxially and connected with the hub for free pivotal movements about transverse sweep axes tangent to a cylinder concentric with said central axis, a plurality of generally radial blades connected respectively with said blade plates for pivotal movements about pitch axes extending generally longitudinally of said blades, said blades being movable about said sweep axes in unison with said blade plates and said blades having equal negative pitch angles providing suitable angles of air attack for causing autorotation of said blades and hub in said predetermined direction as the device descends, and means automatically dependent upon varying centrifugal action of said blades as the result of variations in the speed of autorotation for pivotally moving the blades relatively to said blade plates and about their said pitch axes so as to decrease said negative pitch angles in accordance with increased rotative speeds and so as to increase said negative pitch angles in accordance with decreased rotative speeds.

30. In an aerial device of the class described, the combination of a body adapted to carry a load, a hub connected with the body below the bottom thereof for free rotation relatively thereto about a central normally vertical axis and in a predetermined direction, a plurality of blade plates equally spaced circumaxially and connected with the hub for free pivotal movements about transverse sweep axes tangent to a cylinder concentric with said central axis, a plurality of generally radial blades connected respectively with said blade plates for pivotal movements about pitch axes extending generally longitudinally of said blades, said blades being movable about said sweep axes in unison with said blade plates and said blades having equal negative pitch angles providing suitable angles of air attack for causing autorotation of said blades and hub in said predetermined direction as the device descends, and means automatically dependent upon varying centrifugal action of said blades as the result of variations in the speed of autorotation for pivotally moving the blades relatively to said blade plates and about their said pitch axes so as to decrease said negative pitch angles in accordance with increased rotative speeds and so as to increase said negative pitch angles in accordance with decreased rotative speeds.

31. In an aerial device of the class described, the combination of a body adapted to carry a load, a central vertical pivot rod rigidly connected with the body and extending downwardly therefrom, a hub freely rotatable on the rod below the body and held against relative vertical movement, a plurality of generally radial blades equally spaced circumaxially and connected with the hub for free pivotal movements about transverse sweep axes tangent to a cylinder concentric with said central axis which blades have equal negative pitch angles providing suitable angles of air attack for causing autorotation of said blades and hub in said direction as the device descends, and an air engaging cylindrical fin rigidly connected with the body near the top thereof and which fin has a diameter substantially greater than that of the body and surrounds a portion of the body and which fin is adapted to maintain said device in alignment with the air stream during initial portion of descent, said cylindrical fin being of such size and being so positioned as to serve as a stop for engaging the blades to limit upward and inward movement of said blades.

32. In an aerial device of the class described, the combination of a body adapted to carry a load, a central vertical pivot rod rigidly connected with the body and extending downwardly therefrom, a hub freely rotatable on the rod below the body and held against relative vertical movement, a plurality of generally radial blades equally spaced circumaxially and connected with the hub for free pivotal movements about transverse sweep axes tangent to a cylinder concentric with said central axis which blades have equal negative pitch angles providing suitable angles of air attack for causing autorotation of said blades and hub in said direction as the device descends, and means rigidly connected with said rod and spaced from said hub for engaging the blades to limit inward movement of said blades.

References Cited in the file of this patent

UNITED STATES PATENTS

| | | |
|---|---|---|
| 2,509,481 | Crise | May 30, 1950 |
| 2,526,451 | Bensen | Oct. 17, 1950 |
| 2,545,736 | Isacco | Mar. 10, 1951 |
| 2,682,439 | Joy | June 29, 1954 |